United States Patent [19]

Davies

[11] 4,148,966

[45] Apr. 10, 1979

[54] POLYARYLENE SULPHIDE COATED BACKING

[75] Inventor: Glyndwr J. Davies, London, England

[73] Assignee: The Glacier Metal Company Limited, Middlesex, England

[21] Appl. No.: 557,291

[22] Filed: Mar. 11, 1975

[30] Foreign Application Priority Data

Jan. 22, 1975 [GB] United Kingdom ............... 2750/75

[51] Int. Cl.² .................... B32B 9/04; B32B 15/04
[52] U.S. Cl. .................... 428/411; 428/457; 428/538; 260/37 R; 528/373
[58] Field of Search ............ 428/461, 538, 411, 457; 260/79, 37 R, 79.1; 427/388 A, 388 R; 528/373

[56] References Cited

U.S. PATENT DOCUMENTS

| | | | |
|---|---|---|---|
| 3,451,873 | 6/1969 | Harrison et al. | 260/79 |
| 3,492,125 | 1/1970 | Ray | 426/523 |
| 3,616,186 | 10/1971 | Blackwell | 428/461 |
| 3,622,376 | 11/1971 | Tieszen et al. | 428/457 |
| 3,622,376 | 11/1971 | Tieszen | 260/79 |
| 3,647,500 | 3/1972 | Mizuno | 428/461 |
| 3,728,313 | 4/1973 | Hill, Jr. et al. | 260/79 |
| 3,776,880 | 12/1973 | Blackwell | 260/79 |
| 3,853,824 | 12/1974 | Tieszen | 260/79.1 |
| 3,894,983 | 7/1975 | Higbee | 260/37 R |
| 3,930,078 | 12/1975 | Short | 428/538 |
| 3,931,419 | 1/1976 | Blackwell | 428/538 |
| 3,954,932 | 5/1976 | Coale | 260/79 |
| 4,011,121 | 3/1977 | Doss | 428/457 |
| 4,017,450 | 4/1977 | Bailey | 260/37 R |
| 4,075,388 | 2/1978 | Doss | 428/457 |
| 4,086,376 | 4/1978 | Davies | 428/457 |

FOREIGN PATENT DOCUMENTS 2038332 8/1971 France.

*Primary Examiner*—William R. Dixon, Jr.
*Attorney, Agent, or Firm*—Burns, Doane, Swecker & Mathis

[57] ABSTRACT

This invention is for providing a bearing lining on a backing, for example of aluminium, and uses polyphenylene sulphide which has good bearing properties, in combination with calcium hydroxide or another metallic base to effect a good bond between the lining and the backing.

3 Claims, No Drawings

POLYARYLENE SULPHIDE COATED BACKING

This invention relates to the coating of a backing or substrate, for example an aluminium or aluminium plain bearing backing, with a layer or coating of polyarylene sulphide resin. An object of the invention is to increase the bond of the coating to the backing to produce a reliable bond for use with engineering components as distinct from domestic holloware. Polyarylene sulphides such as polyphenylene sulphide have high temperature stability. The term polyarylene sulphide is further meant not only to include homopolymers but also normally solid arylene sulphide co-polymers and terpolymers.

Polyphenylene sulphide is a crystalline material prepared by the reaction of p-dichlorobenzene and sodium sulphide in a polar solvent. The linear polymer so formed has a fair mechanical strength but it can be cured by heating in air to be cross-linked and to be tough, ductile and extremely insoluble with increased molecular weight and improved coating characteristics. In this specification the term "polyphenylene sulphide" or the more generic term "polyarylene sulphide" includes such polymers with varying degrees of cross-linking in dependence on the heat treatment used.

A "base" is a term used in this specification to mean any substance capable of neutralizing acids.

Polyphenylene sulphide as one form of polyarylene sulphide is itself available in several forms—one form is the raw polymer which has not been heat treated in air to improve its characteristics. Other forms of polyphenylene sulphide can be heat treated in air to increase also the cross-linking. The non-heat treated, or raw, forms of the polymer are unsuitable for fluidised bed coatings because when the powder melts the coating runs and drips during curing. Similarly the non-heat treated polymers are unsuitable for providing a coating by spreading the powder on the substrate because gain the viscosity is unsuitable and it tends to leave voids in the coating or imperfections during heat processing. The grades of polymer which have been heat treated either completely or partially do not suffer from these defects when they are applied as coatings and cured but tend to have worse bonding characteristics than the untreated polymer. Nevertheless, the invention applies to improving the bond of polyarylene sulphide to a backing whether the polymer has been so heat treated or not.

Accordingly the invention provides a backing coated with polyarylene sulphide resin incorporating a base which is stable at least up to 200° C.

Preferably the base is inorganic.

According to another aspect the invention provides a process for applying a coating of polyarylene sulphide polymer to a backing of aluminium in which polymer is mixed with a compound capable of producing a base during the process particularly at the bond interface.

Preferably the base is selected from a group comprising hydroxides and carbonates of metals in Group I or II of the Periodic Table, and preferably in a proportion of 1-10% by weight of the polyphenylene sulphide. The coating may be of the order of 0.005-0.015" thick. The base may be mixed with the polymer or applied to the backing which is to be coated. 5% of calcium hydroxide is suitable for example.

In one example of the process polyphenylene sulphide is mixed intimately with a percentage of sodium carbonate before coating is commenced. One method of achieving the intimate mixing is by wetting the polyphenylene sulphide with an equal weight of water by stirring until a paste is formed. The weighed quantity of sodium carbonate is dissolved in the water before the mixing process. The optimum level of sodium carbonate has been found for one form of polyphenylene sulphide polymer to lie between 1 and 3 percent of the polyphenylene sulphide when in the form of decahydrate crystals $Na_2(CO_3 10H_2O)$.

In a further embodiment lithium hydroxide may be used as an alternative to sodium carbonate.

Of course, base producing compounds rather than bases may be used, particularly if the use of those compounds or bases leaves rather an inert residue in the coating after curing. Sodium carbonate may, if not incorporated within the limits of 1-3%, cause in the finished coating bubbling due to volatile evolution. Lithium hydroxide may not have this disadvantage.

It is probable that the cause of bad bonding is the presence of the very easily hydrolysed sulphur-aluminium bond. Such bonds could arise from acid attack of the oxidised aluminium surface from such species as $H_2S$ or a molecule containing SH pendant or end groups. Such attack would be inhibited by alkaline conditions.

Thus it is probable that other base additives such as the hydroxides and carbonates of all Group I and II metals will be effective in preventing poor bonding when used at the correct concentration and providing that these additives remain as stable alkalis during the coating and curing process that is, stable up to at least 300° C.

Calcium hydroxide is a good base for providing a sound bond and good bearing properties at the surface of the coating, even if it is mixed with dry resin powder. Certain examples will now be described.

EXAMPLE 1.

1 Kilogram of heat treated polyphenylene sulphide powder was added to 1 kilogram of aqueous solution containing 20 grams of sodium carbonate decahydrate crystals. The mixture was stirred for 30 minutes until all the polymer had been wetted to an even thick paste.

The thick paste was allowed to dry in a warm current of air. After drying the powder was sieved through a BS.44 sieve and placed in a fluidising tank.

Blanks with dimensions of 4"×2"×0.064" of an aluminium alloy NS4 were abraded by brushing and coated in fluidised bed and finally heated at 300° C. for 1 hour to cure the resin and bond the coating to the backing.

The blanks were sawn into ½" strips.

Immediately after production all the coatings were well bonded and could not be picked off with a knife blade. After boiling for 2 hours in water coatings were still firmly bonded to the backings.

Blanks stored in air untouched for 5 days after production were again tested and the bond was still firm.

Similar blanks coated using resin without the base had their coatings easily lifted off with a knife after the boiling and storing described above.

EXAMPLE 2

10 grams of calcium hydroxide were dry mixed with 1 Kg of heat treated polyphenylene sulphide in a high speed mixer and the mixture placed in a fluidising tank. Treatment was otherwise as in Example 1, and a very effective bond was achieved.

EXAMPLE 3

Blanks were coated in several tests using instead of calcium hydroxide, magnesium oxide fine powder in proportions between 0.1% and 5% of the polymer and a good bond was achieved.

What I claim as my invention and desire to secure by Letters Patent is:

1. A coated backing in which the backing is aluminum or aluminum alloy and in which the coating is a heat-treated polyarylene sulphide resin incorporating between 1–3% by weight sodium carbonate for establishing a bond between said backing and said coating.

2. A coated backing in which the backing is aluminum or aluminum alloy and in which the coating is a heat-treated polyarylene sulphide resin incorporating between 0.1 and 5.0% by weight lithium hydroxide, for establishing a bond between said backing and said coating.

3. A coated backing in which the backing is aluminum or aluminum alloy and in which the coating is a heat-treated polyarylene sulphide resin incorporating between 0.1 and 5.0% calcium hydroxide for establishing a bond between said backing and said coating.

* * * * *